(12) United States Patent
Hori et al.

(10) Patent No.: US 7,168,859 B2
(45) Date of Patent: Jan. 30, 2007

(54) THRUST BALL BEARING

(75) Inventors: Michio Hori, Mie (JP); Yasuyuki Tsuji, Mie (JP)

(73) Assignee: NTN Corporation, Osaka (JP)

( * ) Notice: Subject to any disclaimer, the term of this patent is extended or adjusted under 35 U.S.C. 154(b) by 126 days.

(21) Appl. No.: 10/854,265

(22) Filed: May 27, 2004

(65) Prior Publication Data

US 2004/0264826 A1 Dec. 30, 2004

(30) Foreign Application Priority Data

May 29, 2003 (JP) .............................. 2003-153042

(51) Int. Cl.
*F16C 33/38* (2006.01)

(52) U.S. Cl. ..................................... 384/614

(58) Field of Classification Search ................ 384/614, 384/523, 528, 533, 534; 29/898.067
See application file for complete search history.

(56) References Cited

U.S. PATENT DOCUMENTS

| | | | | |
|---|---|---|---|---|
| 1,114,932 A | * | 10/1914 | Straub | ......................... 384/534 |
| 1,176,804 A | * | 3/1916 | Winkler | ........................ 384/528 |
| 1,638,271 A | * | 8/1927 | Nordstrum | .................. 384/614 |
| 2,120,154 A | * | 6/1938 | Schildgen et al. | .......... 384/534 |

* cited by examiner

*Primary Examiner*—Thomas R. Hannon
(74) *Attorney, Agent, or Firm*—Wenderoth, Lind & Ponack, L.L.P.

(57) ABSTRACT

The object is to reduce the contact surface pressure between the balls and the retainer of a thrust ball bearing at slide contact positions, thereby suppressing the wear of the retainer. By increasing the depth of drawing of inner and outer portions embracing the balls received in pockets of the retainer, when the balls roll on the raceways of the outer ring and the inner ring, the balls and the retainer are adapted to slidably contact each other at three portions, i.e. the peripheral edge of each pocket, and the outer portion and the inner portion of the retainer. Thus, it is possible to reduce the contact surface pressure at the respective slide contact positions compared to the prior art. Thus, it is possible to suppress the wear of the retainer.

1 Claim, 5 Drawing Sheets

THRUST BALL BEARING

BACKGROUND OF THE INVENTION

This invention relates to a thrust ball bearing in which is mounted a retainer formed by pressing a metal plate.

In an ordinary thrust ball bearing, a plurality of balls, mounted between two bearing rings, are rollably retained by an annularly formed retainer (see e.g. "Rolling Bearing Handbook edited by J. Brändlein et al, translated by Takeo Yoshitake, published by Kogyo Chosa-kai in 1996", pages 32–33).

FIG. 3 shows an example of such a thrust ball bearing. This bearing comprises an outer ring 51, an inner ring 52, a plurality of balls 53 mounted between these bearing rings 51 and 52, and a retainer 54 rollably retaining the balls 53. The retainer 54 is annularly formed by pressing a metal plate, and has pockets 55 for receiving the respective balls 53, formed at predetermined intervals in the circumferential direction. Its inner portion 56 and outer portion 57, which embrace the balls 53 received in the pockets 55, are formed by bending. These side portions 56 and 57 of the retainer 54 are drawn so that the distance between the side portions at portions between the adjacent pockets 55 is narrow to keep the balls 53 from falling.

In this thrust ball bearing, as shown in FIGS. 4 and 5, when the balls 53 turn about a common axis while pushing and advancing the retainer 54 as the inner ring 52 rotates, the respective balls 53 and the retainer 54 are in slide contact with each other at one point only, i.e. at the corner portion of the peripheral edge of each pocket 55.

Thus, at the slide contact position of the balls 53 and the retainer 54, the contact surface pressure increases, so that lubricating oil stuck on the surfaces of the balls 53 tends to be scraped off, and thus wear of the retainer 54 tends to progress. Further, if the amount of wear of the retainer 54 or the balls 53 increases, wear powder trapped between the raceways of the bearing rings 51 and 52 and the balls 53 may cause premature breakage of the bearing ring 51 or 52 or the balls 53.

In particular, as with bearings mounted in HSTs (hydrostatic transmissions), in case they are used under conditions where uneven loads act, the speeds at which the respective balls rotate about a common axis tend to vary, so that the contact surface pressure between part of the balls and the retainer at slide contact positions tends to further increase. Thus, the possibility of the above problem occurring is high.

An object of this invention is to reduce the contact surface pressure between the balls and the retainer of the thrust ball bearing at slide contact positions, thereby suppressing the wear of the retainer.

SUMMARY OF THE INVENTION

In order to solve this object, in this invention, when the balls rotate about a common axis, each ball and the retainer are adapted to contact each other at three portions. With this arrangement, it is possible to reduce the contact surface pressure at slide contact positions between the balls and the retainer, thereby reducing the amount by which lubricating oil on the surfaces of the balls is scraped off. Thus, it is possible to suppress wear of the retainer.

Specifically, there is provided a thrust ball bearing comprising an outer ring, an inner ring, a plurality of balls mounted between the inner ring and the outer ring, and a retainer for rollably retaining the balls, the retainer being annularly formed by pressing a metal plate, having pockets for receiving the respective balls at predetermined intervals in the circumferential direction, and having annular inner and outer portions formed by bending to embrace the balls, which are received in the respective pockets, the retainer having its both side portions being drawn such that the distance between the side portions at portions between the adjacent pockets is narrow to prevent a fall of the balls, wherein drawing at both side portions of the retainer is made deep so that when the balls roll on raceways of the inner and outer bearing rings, each of the balls and the retainer slidably contact each other at three portions, i.e. at a peripheral edge of the each pocket, and the inner portion and the outer portion of the retainer.

In this arrangement, the three slide contact positions between each of the balls and the retainer are preferably positioned on a plane substantially perpendicular to the direction in which the respective balls rotate about a common axis. Further, the distances from each of the balls to the three slide contact positions with the retainer are preferably substantially equal to each other. This is because the force with which the balls push and advance the retainer is applied uniformly to the respective slide contact positions, so that the contact surface pressure at the respective slide contact positions markedly decreases at the respective slide contact positions compared to the prior art, and thus the progression of wear of the retainer is slower.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
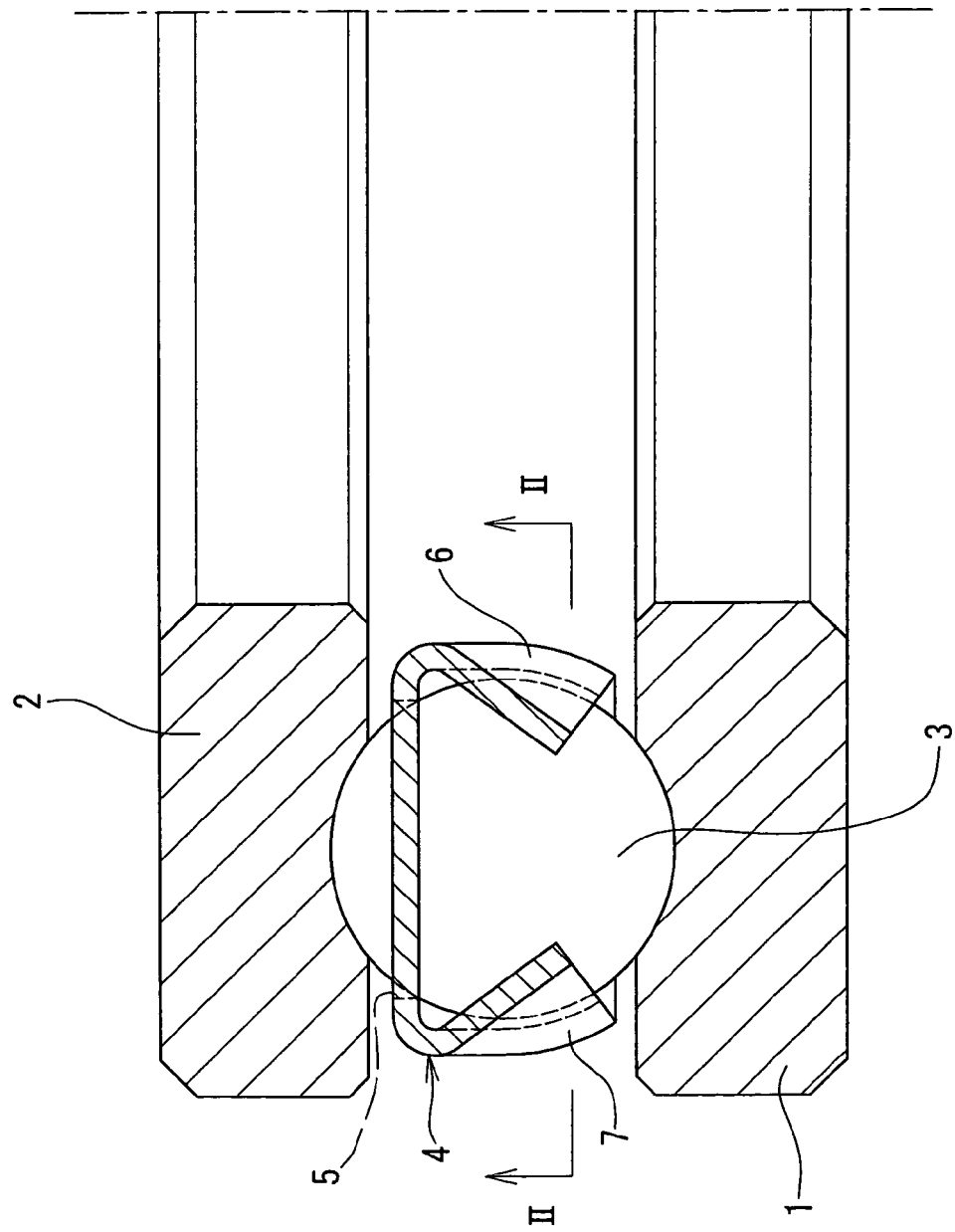
FIG. 1 is a front sectional view of a portion of the thrust ball bearing of an embodiment.
Figure 2:
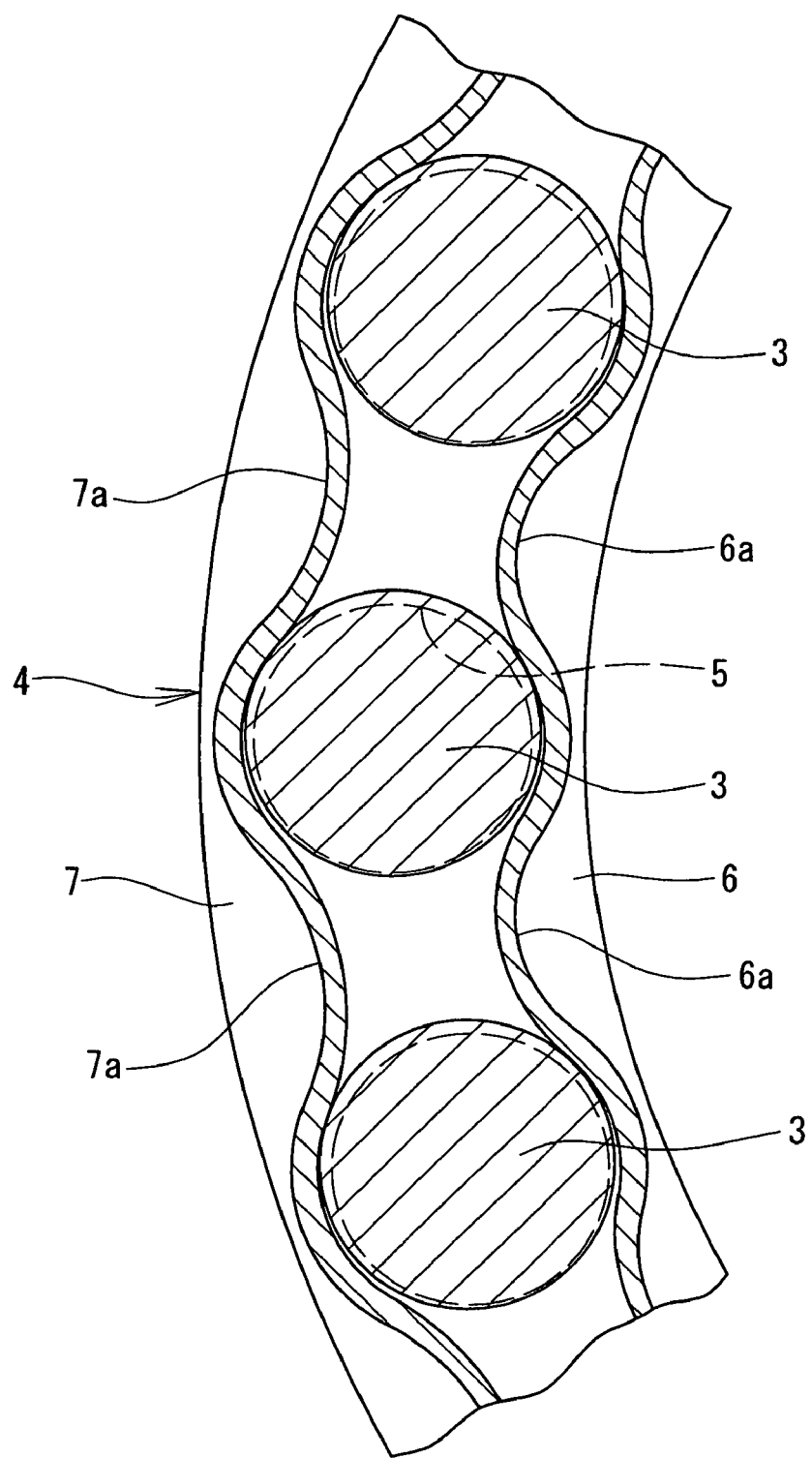
FIG. 2 is a sectional view along line II—II of FIG. 1.

With reference to FIGS. 1 and 2, the embodiment of this invention will be described. As shown in FIG. 1, the thrust ball bearing comprises an outer ring 1, an inner ring 2, a plurality of balls 3 mounted between the outer and inner rings 1 and 2, and a retainer 4 for rollably retaining the balls 3.

Figure 3:
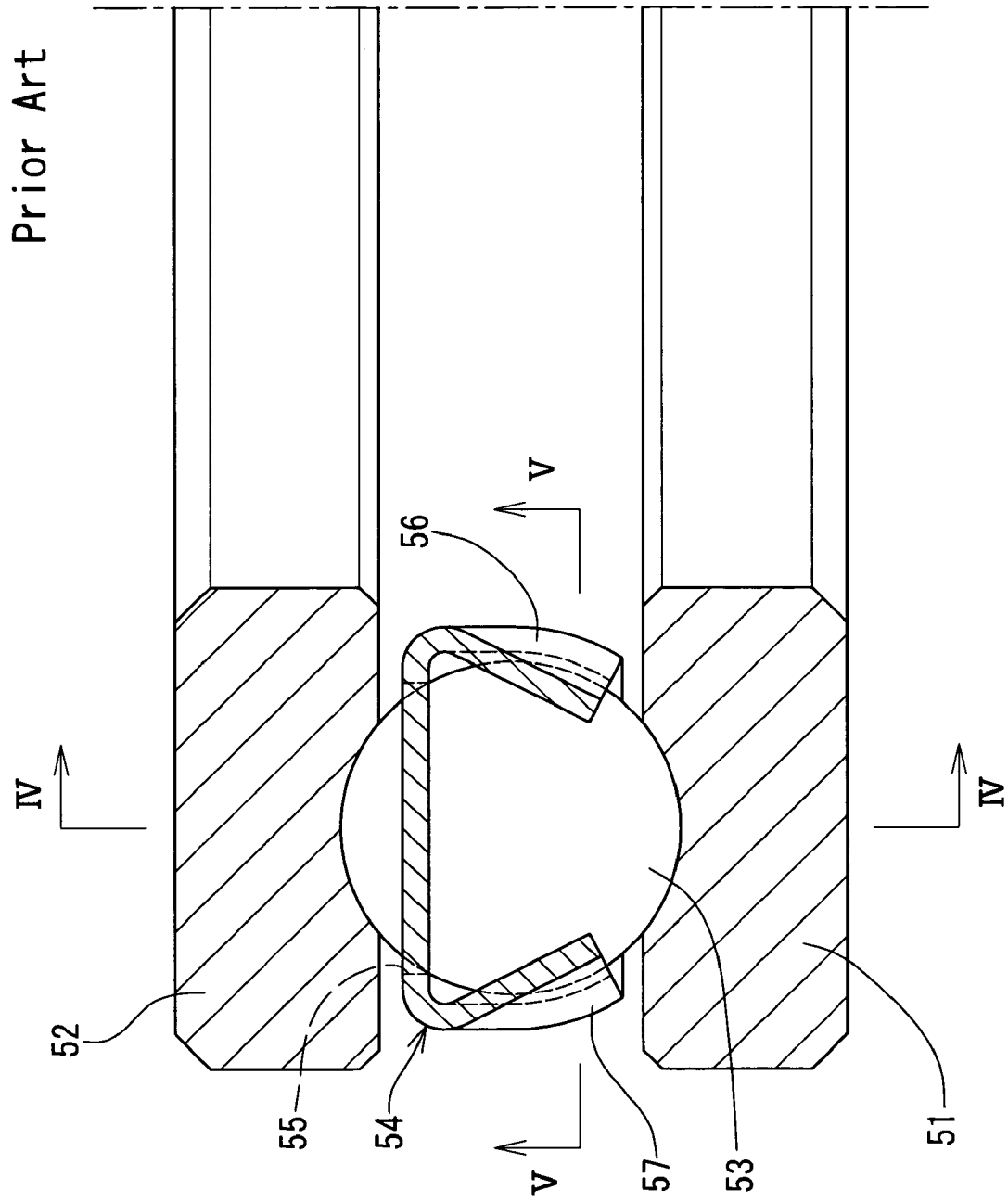
FIG. 3 is a front sectional view of a portion of a conventional thrust ball bearing.
Figure 4:
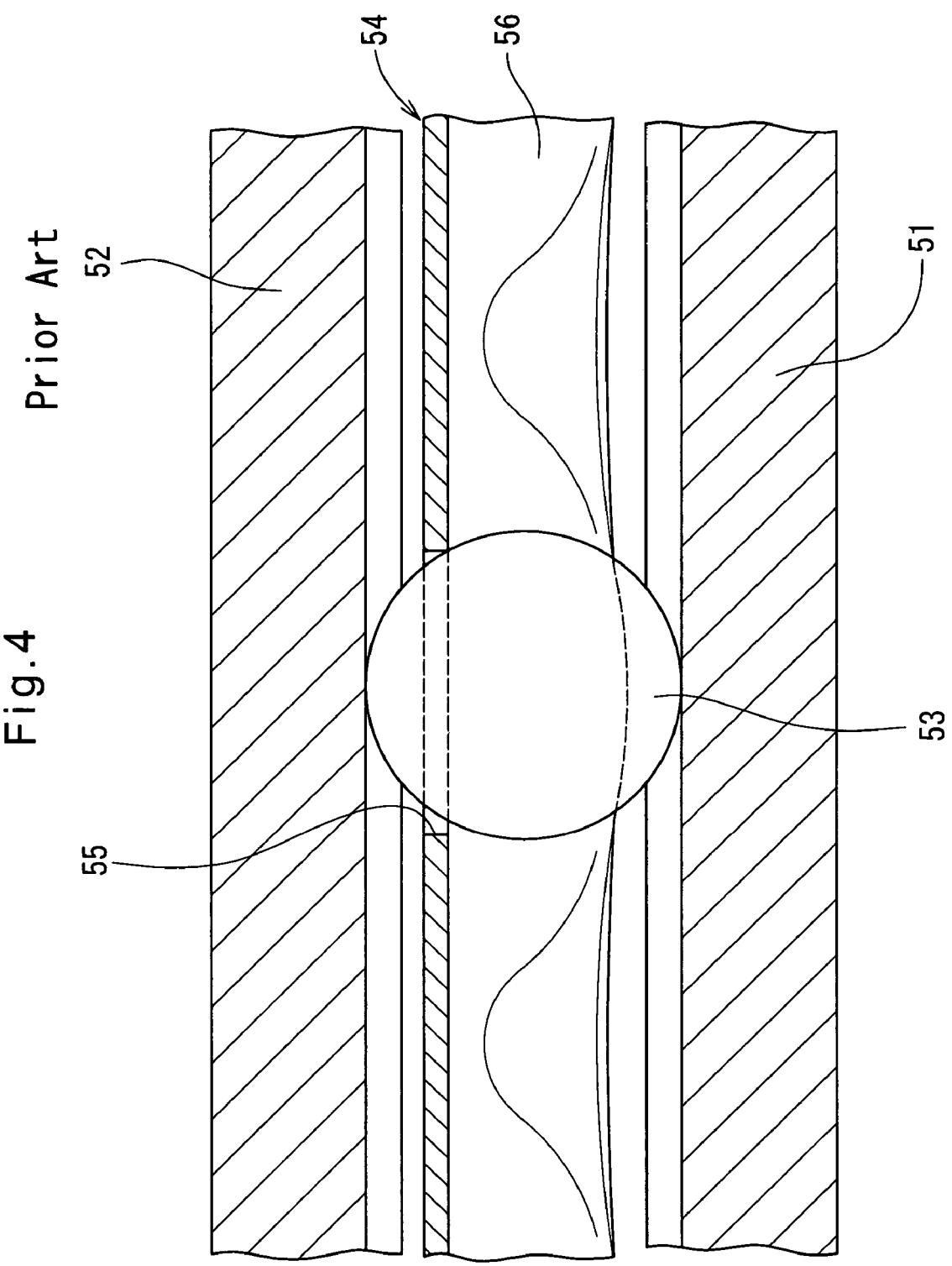
FIG. 4 is a sectional view along line IV—IV of FIG. 3.
Figure 5:
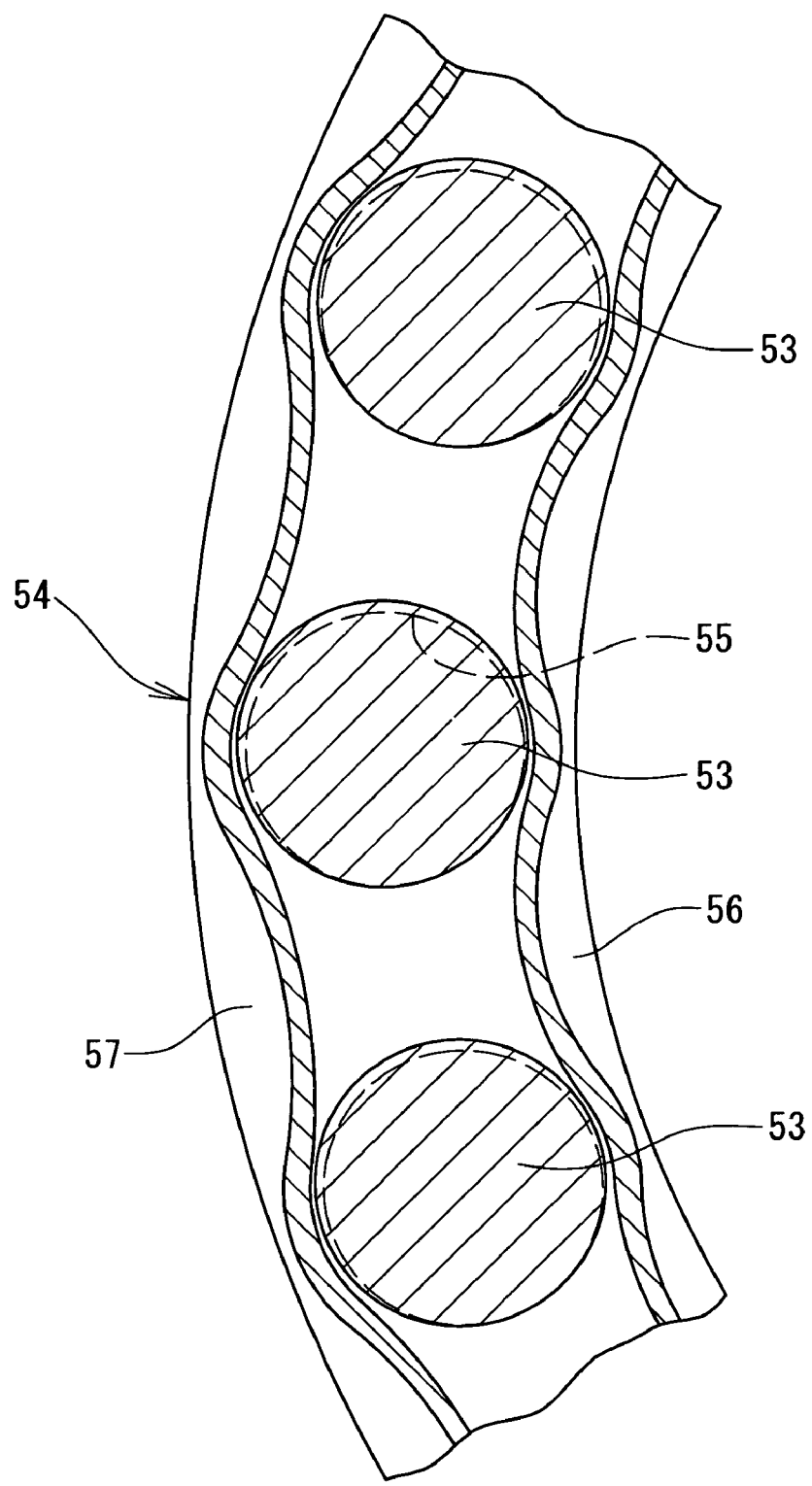
FIG. 5 is a sectional view along line V—V of FIG. 3.

The retainer 4 is annularly formed by pressing a metal plate, and has pockets 5 for receiving the balls 3 at predetermined intervals in the circumferential direction. Its inner portion 6 and outer portion 7, which embrace the balls 3 in the respective pockets 5, are formed by bending the plate. These side portions 6 and 7 are drawn so that the distance between the side portions at portions between the adjacent pockets 5 is narrow, thereby preventing a fall of the balls 3. Further, as shown in FIG. 2, the drawn portions 6a and 7a at the side portions 6 and 7 are formed deeper than in the conventional bearing shown in FIGS. 3–5, and are adapted to be brought into slide contact with the balls 3, which rotate about a common axis (roll on the raceways of the bearing rings 1 and 2) while pushing and advancing the retainer 4 as the inner ring 2 rotates.

Thus, while the balls 3 are rotating about the common axis, the balls 3 and the retainer 4 slidably contact each other at three portions, i.e. the peripheral edge of each pocket 5, inner portion 6 and outer portion 7 of the retainer 4. Here, the three slide contact positions between the respective balls 3 and the retainer 4 are positioned in a plane substantially perpendicular to the direction in which the balls 3 rotate about the common axis and are set such that the distances from the centers of the respective balls are substantially equal to each other. Further, in order to increase the contact area with the balls 3, the drawn portions 6a and 7a of the side portions 6 and 7 of the retainer 4 are formed so as to slidably contact the balls on concave curved surfaces.

This thrust ball bearing has such a structure, and since the force with which the balls 3 push and advance the retainer 4 is applied uniformly to the three slide contact positions with the retainer 4, compared with the above-described conventional bearing, the contact surface pressure at the respective slide contact positions is fairly small, so that the amount by which lubricating oil on the surfaces of the balls 3 is scraped off is small. Thus, while the number of portions where wear occurs increases, progression of wear of the retainer at each portion is slow, so that the amount of wear of the entire retainer 4 markedly decreases compared to the prior art. Further, the balls 3 will not get marred or prematurely worn.

As described above, according to this invention, by increasing the depth of drawing of the retainer of the thrust ball bearing at both side portions, when the balls roll on the raceways of the outer ring and the inner ring, the balls and the retainer are adapted to slidably contact each other at three portions, i.e. the peripheral edge of each pocket, and the outer portion and the inner portion of the retainer. Thus, it is possible to reduce the contact surface pressure at the respective slide contact positions compared to the prior art. Thus, it is possible to suppress the wear of the entire retainer, thus preventing premature damage of the bearing rings and the balls, so that it is possible to extend the life of the bearing.

What is claimed is:

1. A thrust ball bearing comprising:
   an outer ring;
   an inner ring;
   a plurality of balls mounted between said outer ring and said inner ring; and
   a retainer arranged between said outer ring and said inner ring for rollably retaining said balls;
   wherein said retainer comprises a flat annular portion, and radially inner and outer annular flanges extending from said flat annular portion in a generally axial direction;
   wherein said flat annular portion of said retainer has a plurality of pockets formed therein;
   wherein said balls are respectively disposed in said pockets of said flat annular portion of said retainer;
   wherein said outer annular flange is radially inwardly bent at circumferential locations between said pockets, and said inner annular flange is radially outwardly bent at circumferential locations between said pockets, so as to form radially narrowed portions of said retainer to surround said balls, respectively, and prevent said balls from falling from said retainer; and
   wherein said pockets of said flat annular portion of said retainer, said inner and outer flanges of said retainer, and said balls are configured such that, when said balls roll upon relative rotation between said inner and outer rings thereby causing said balls to advance said retainer in a circumferential direction, each of said balls contacts said retainer at three portions, including a first portion on a leading peripheral edge of the respective pocket of said flat annular portion of said retainer, a second portion on a generally radially outwardly facing surface of a radially outwardly bent portion of said inner annular flange of said retainer, and a third portion on a generally radially inwardly facing surface of a radially inwardly bent portion of said outer annular flange of said retainer, said second and third portions of said retainer constituting concave curved surfaces of said retainer, with said concave curved surfaces of said retainer making surface contact with each of said balls.

* * * * *